Figure 1:
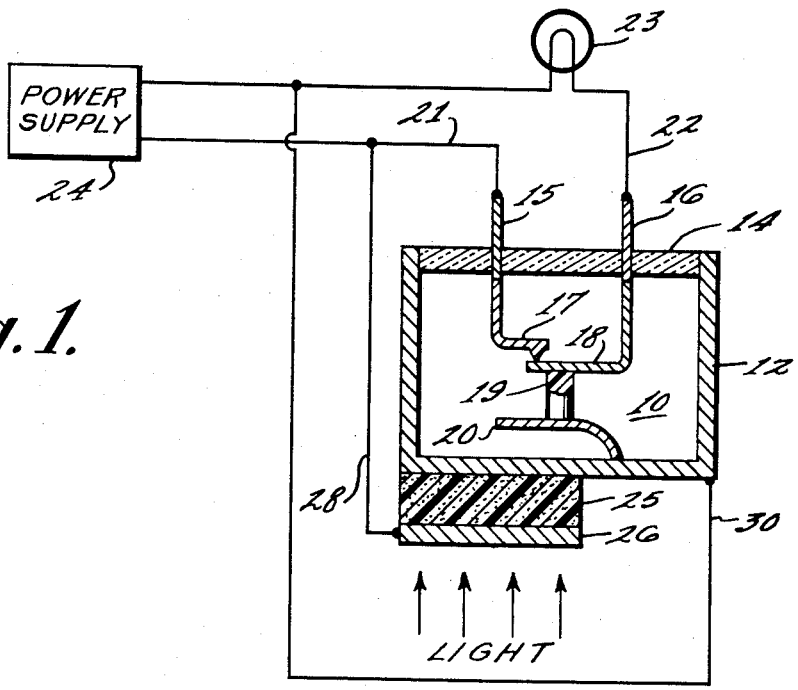

Feb. 24, 1959  B. KAZAN  2,875,348
PHOTOCELL CONTROL APPARATUS
Filed Dec. 21, 1955

INVENTOR.
Benjamin Kazan
BY
William A. Zalesnk
ATTORNEY.

United States Patent Office 2,875,348
Patented Feb. 24, 1959

2,875,348

PHOTOCELL CONTROL APPARATUS

Benjamin Kazan, Princeton, N. J., assignor to Radio Corporation of America, a corporation of Delaware Application December 21, 1955, Serial No. 554,573

6 Claims. (Cl. 250—206)

This invention relates to photocell control apparatus and particularly to improved control apparatus for thermally responsive devices.

In the past, photocells have been employed to control the operation of thermal relays by means of current flow from the photocell passing through a heating wire within the relay. The temperature of the heating wire controls the expansion of the internal elements of the relay which in turn controls the operation of a switch element. Such systems are comparatively inefficient due to heat dissipated in the photocell and in addition, they occupy relatively large volume.

Accordingly, the objects of the invention are directed toward the provision of improved control apparatus for a thermal switch, said apparatus being efficient and of minimum size and comparatively inexpensive and simple to manufacture.

In apparatus embodying the principles of the invention, a photocell, which is to control the operation of a thermal switch, is mounted in direct contact with the thermal switch. With such a physical arrangement, the heating of the photocell itself, due to its photocurrent, controls the operation of the switch. In an alternative embodiment of the invention, a heat generating impedance element, such as a resistor, may be provided in series with the photocell and in direct contact with the switch so that its internal heating also affects the switch.

Figure 2:
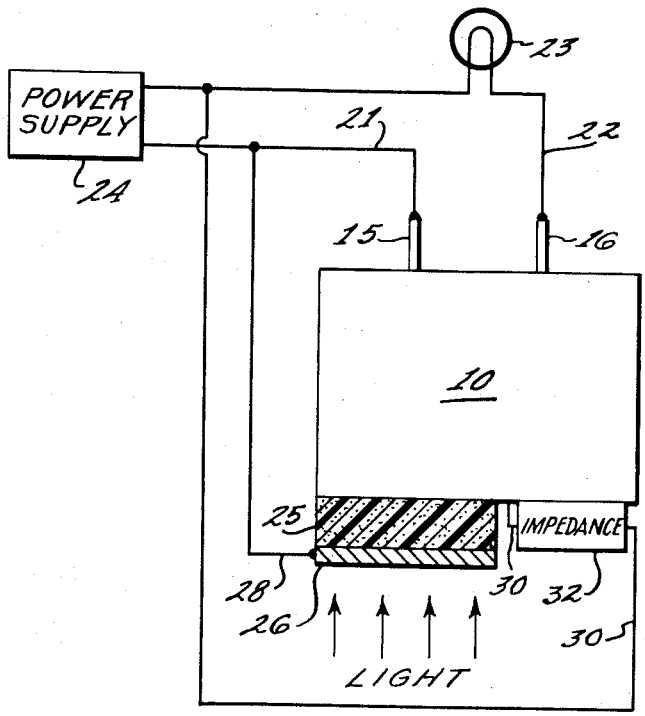

In the drawing:

Fig. 1 is an elevational view, partly in section of apparatus embodying the principles of the invention and a schematic representation of a circuit in which it may be employed; and, Fig. 2 is an elevational view, partly in section, of a modification of apparatus embodying the principles of the invention and a schematic representation of a circuit in which it may be employed.

Referring to Fig. 1, the apparatus shown therein includes a conventional thermal switch 10 which may include a metallic housing 12 having an insulating wall 14 which supports conductive pins or leads 15 and 16 from the contact members 17 and 18, respectively, of the switch mechanism. As shown, the member 17 is stationary and the member 18 is movable and is provided with an insulating button 19. The thermal switch 10 also includes a heat responsive element 20, for example a bimetallic strip suitably secured to or otherwise mounted in heat transfer relation with the wall of the housing 12. The bimetallic strip moves the element 18 by direct contact therewith through the insulating button 19. Output leads 21 and 22 from the leads 15 and 16, respectively, are connected in series with a device to be controlled by the switch, for example an incandescent bulb 23, and a power source, for example, a conventional 120 volt A. C. power source 24.

According to the invention, a device which conducts electric current in response to an exciting force, for example radiation, is provided in direct contact with the thermal switch 10. One suitable device of this type is a photoconductive cell which includes a layer 25 of a mixture of cadmium sulfide powder in an ethyl cellulose binder sprayed or otherwise applied directly on the metallic housing 12 as a supporting base electrode. The photocell also includes a thin conductive light transmitting film 26 of silver paint applied on the layer of cadmium sulfide. Leads 28 and 30 are connected between the conductive film 26 and the housing 12, which is the base electrode of the photocell, respectively and the appropriate terminals of the power supply 24.

In the photocell, any suitable binder for the photoconductive cadmium sulfide powder may be used and other photoconductive materials, such as powdered cadmium selenide, may be used. In addition, the thin light transmitting conductive film 26 may be evaporated gold or the like.

In operation of the apparatus of Fig. 1, the photocell is oriented so that incident light, which is to control the operation of the switch 10, falls on the silver film electrode 26 and penetrates into the cadmium sulfide layer 25. The resistance of the cadmium sulfide layer varies with the intensity of the incident light as does the current flow through the photocell and through the metal base electrode 12. As this current flows, the metal base electrode and the bimetallic strip 20 are heated and if the incident light is of sufficient intensity, the strip 20 is heated sufficiently to operate the switch contact elements 17 and 18 to either open or close them, depending upon whether the bimetallic strip is designed to open by the application of heat or close by the application of heat, and to turn the bulb 23 either on or off.

Referring to Fig. 2, a modification of the invention includes all of the apparatus of Fig. 1 and, in addition, an auxiliary circuit element, for example a resistor 32 mounted within an insulating shell in conventional fashion is inserted into the photocell circuit in the lead 30 and in direct physical contact with the metal base electrode 12. The resistor 32 limits the current flow in the photocell circuit and the heat generated therein due to current flow continues with the heat in the photocell to operate the thermal switch.

Apparatus of the type described above is suitable for controlling relatively large loads such as motors or individual lights, such as street lights, or even banks of lights. The invention is particularly suited for controlling street lights or similar illuminating devices since the apparatus has a comparatively large natural time delay so that transient light does not affect its operation. This time delay is achieved because the cadmium sulfide layer warms gradually due to the heat capacity of the switch and the photocell and this heat capacity may be increased or decreased by changing the mass of conductive material in contact with the switch.

In the photocells described above, the impedance of the cadmium sulfide is determined by its thickness and substantially any thickness which provides adequate light penetration may be used. Thus, the thickness of the cadmium sulfide layer may be about 10 mils as a maximum. One photocell which was employed to control the operation of a 250 watt incandescent bulb included a cadmium sulfide layer of about 7 mils in thickness and about one centimeter square in area. With 100 volts D. C. applied to it, this cell passed about one milliampere current per foot candle of incident light. Such cells have operated switches under room light of about 10 foot candles in about 30 seconds with the temperature of the switch at about 160° C. Devices of the type described which use cadmium sulfide and cadmium selenide photoconductive materials are sensitive to X-ray and infra-red radiation and may be employed as detectors of such radiations. In applications of this type, the devices may be used as safety devices to activate suitable equipment or alarms when a predetermined level of radiation has been reached.

Apparatus embodying the principles of the invention provide sensitive control while being comparatively rugged and small in size and relatively simple and inexpensive to manufacture.

What is claimed is:

1. An electrical device comprising a thermal switch and a photocell in direct thermal contact therewith such that heat generated in said photocell passes directly into said switch.

2. An electrical device comprising a thermal switch and a photoconducting member in direct thermal contact therewith such that heat generated in said photocell passes directly into said switch.

3. An electrical device comprising a first switching element responsive to heat and a second element in direct contact therewith and adapted to generate heat in response to radiation falling thereon.

4. An electrical device comprising a thermal switch including a metallic housing in contact with a portion of said switch, and a photocell in direct physical contact with said housing.

5. An electrical device comprising a thermal switch including a metallic housing, a heat responsive element in heat transfer relation with said housing, and a photocell in direct physical contact with said housing.

6. An electrical device comprising a thermal switch including a metallic housing, a heat responsive element in heat transfer relation with said housing, a layer of photoconductive material on said housing, and a thin light-transmitting conductive film thereon.

References Cited in the file of this patent
UNITED STATES PATENTS

| | | |
|---|---|---|
| 1,618,816 | Davies | Feb. 22, 1927 |
| 1,895,869 | Stevens | Jan. 31, 1933 |
| 2,237,579 | Ronning | Apr. 8, 1941 |
| 2,745,021 | Kurshan | May 8, 1956 |